United States Patent [19]
Fulghum

[11] Patent Number: 6,078,967
[45] Date of Patent: Jun. 20, 2000

[54] SYSTEM FOR UPGRADING FUNCTIONALITY OF A PERIPHERAL DEVICE UTILIZING A REMOVABLE ROM HAVING RELOCATABLE OBJECT CODE

[75] Inventor: Patrick W. Fulghum, Boise, Id.

[73] Assignee: Hewlett-Packard Company, Palo Alto, Calif.

[21] Appl. No.: 09/030,665

[22] Filed: Feb. 25, 1998

[51] Int. Cl.[7] ................................................. G06F 13/14
[52] U.S. Cl. ................................ 710/2; 711/115; 713/2; 375/220; 375/222
[58] Field of Search ..................... 710/1, 2; 711/115; 713/2; 375/220, 222; 235/375; 335/375

[56] References Cited

U.S. PATENT DOCUMENTS

| | | | |
|---|---|---|---|
| 4,249,071 | 2/1981 | Simjian | 235/375 |
| 5,161,169 | 11/1992 | Galano et al. | 375/220 |
| 5,210,854 | 5/1993 | Beaverton et al. | 395/712 |
| 5,268,928 | 12/1993 | Herh et al. | 375/222 |
| 5,568,641 | 10/1996 | Nelson et al. | 713/2 |
| 5,761,528 | 6/1998 | Arai | 710/2 |
| 5,781,921 | 7/1998 | Nichols | 711/115 |

*Primary Examiner*—Thomas C. Lee
*Assistant Examiner*—Abdelmoniem Elamin

[57] ABSTRACT

An apparatus is disclosed for extending functionality to a peripheral. The apparatus included a peripheral device having a processor, a dedicated storage device containing an enabling algorithm comprising a program code, and a receiver adapted to receive a removable storage device. An embedded operating system of the apparatus is associated with the peripheral device. The apparatus includes a removable storage device containing code. The code is indicative of extended functionality comprising extended features enabled via the embedded operating system. The receiver is configured to receive the code from the removable storage device which is operatively associated with extending functionality to the peripheral device. A method according to the apparatus is also disclosed.

17 Claims, 2 Drawing Sheets

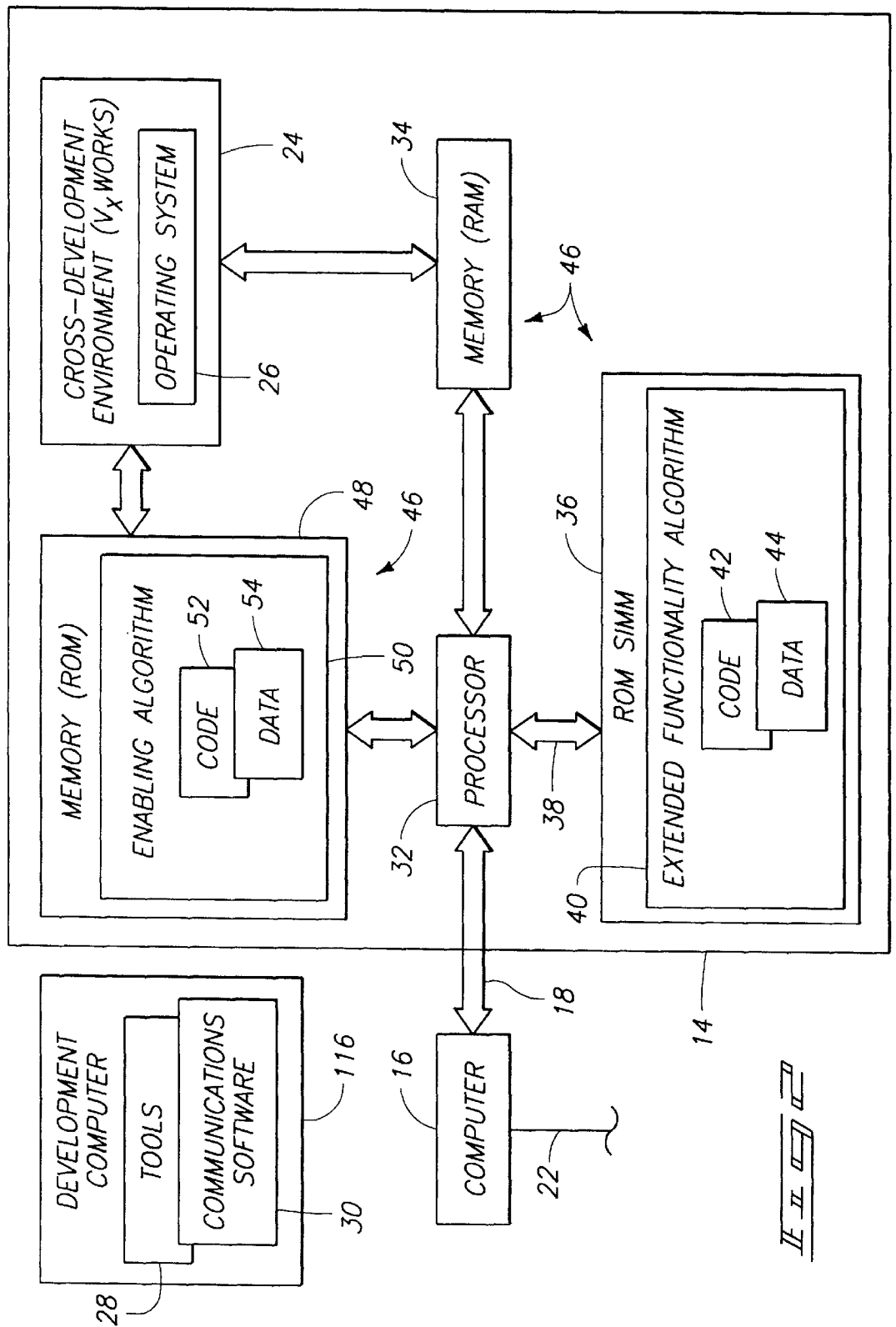

SYSTEM FOR UPGRADING FUNCTIONALITY OF A PERIPHERAL DEVICE UTILIZING A REMOVABLE ROM HAVING RELOCATABLE OBJECT CODE

FIELD OF THE INVENTION

The present invention is directed to peripheral devices, and more particularly to systems for adding/upgrading functionality to peripheral devices such as printers and multi-functional peripherals having embedded operating systems.

BACKGROUND OF THE INVENTION

The ability to add/upgrade functionality to a peripheral device such as a printer has been widely proposed and is reasonably well understood in the art. In general, upgrading of printer functionality has involved adding or exchanging software/hardware such as upgrading firmware that contains new software content for use by the printer. Manufacturers and third party developers desire the ability to add functionality to a printer by upgrading printer firmware after the printer has left the assembly line, and possibly while the printer is in a customer's possession.

One early technique for upgrading functionality to a printer involved the use of a font cartridge with a printer such as an HP Laserjet II printer. A typical font cartridge printer contained fonts already built into the printer, as soft fonts, which reside on a hard disk built into the printer or on a hard disk of an associated computer. The font cartridge was a plug-in module containing a ROM chip that stored one or several sets of additional bitmapped or outline fonts for one or more typefaces. Each cartridge contained a specific set of fonts stored in the ROM chip. When a user desired a new font, a new plug-in cartridge containing the desired font was merely plugged into a receiving slot on the printer. However, such upgrades were limited merely to changing the set of type characters capable of being produced by a printer.

Subsequent generations of printers, for example, later generations of HP Laserjet printers, have used one of several systems for extending the print features and functionality of a printer. One system involves running code out of an installed ROM. Such a such system utilizes a print formatter having a Single In-line Memory Module (SIMM) socket. Memory in the form of ROM contained on the SIMM, comprising a ROM SIMM, extends the features of the printer when a user plugs a ROM SIMM into the SIMM socket. The ROM SIMM contains both executable code and associated data. The code is then actually executed from the installed ROM. By running the code directly out of the ROM, the formatter RAM requirements for the printer are reduced. Additionally, the loading/unloading of a ROM SIMM is well within the capabilities of an end user, since all that is required is the installation of a ROM SIMM in an available SIMM socket on the print formatter. However, the implementation of a ROM SIMM and SIMM socket increases the complexity of the printer firmware. Furthermore, a complex algorithm, such as Position Independent Code/Position Independent Data (PIC/PID) manager, is needed in order to run the code directly out of ROM. Hence, the cost and complexity of the printer are increased.

Another system involves placing executable code and data on a hard disk of an accessory disk drive provided on the printer. The code is executed by copying the code from the hard disk and placing it into RAM on the print formatter. In one implementation, the code is packaged as a relocatable object file format (ROFF) entity. By packaging the code as a ROFF entity, the need for complex algorithms such a PIC/PID are eliminated. However, the RAM requirements for the formatter are increased, which increases overall cost and complexity. Additionally, packaging of the code into a ROFF entity requires the use of proprietary tools which can only be obtained from the manufacturer. Even further, a loader comprising a complex algorithm has to be added to the printer firmware to enable loading of the code into RAM. Finally, administration of a dedicated hard drive on the printer creates an additional layer of complexity for a user.

Yet another system involves providing a FLASH ROM on the printer. The FLASH ROM allows a user to increase or update the executable code present on an embedded device or printer. Typically, a user updates the FLASH ROM with one or more utility programs. Most PC BIOS's are configured to use this system. However, FLASH ROM's are expensive which makes this system impractical and cost prohibitive for printers.

SUMMARY OF THE INVENTION

According to one aspect of the invention, an apparatus is disclosed for extending functionality to a peripheral. The apparatus includes a peripheral device having a processor, a dedicated storage device containing an enabling algorithm comprising a program code, and a receiver adapted to receive a removable storage device. An embedded operating system of the apparatus is associated with the peripheral device. The apparatus includes a removable storage device containing code indicative of extended functionality comprising features enabled via the embedded operating system. The receiver is configured to receive the code from the removable storage device which is operatively associated with extending functionality to the peripheral device.

According to another aspect of the invention, a system is disclosed for configuring functionality to a peripheral. The system includes an I/O interface for receiving input commands. A peripheral device of the system has a processor and a dedicated storage device configured to perform mechanical functions in response to a command from a separate device. The peripheral device is connected with the I/O interface. The system includes an embedded operating system enabled via the processor. A removable memory is associated with the peripheral via a receiver. The removable memory contains update code and is operative to deliver the update code to the processor to enable upgraded peripheral functionality.

According to yet another aspect of the invention, a method is disclosed for enhancing functionality of a peripheral. The method includes the step of receiving a removable storage device containing code indicative of extended functionality; storing an enabling algorithm in a dedicated storage device of the peripheral device; and executing the enabling algorithm to enhance functionality of the peripheral by enabling the code from the removable storage device within an operating system of the peripheral.

Objects, features and advantages of the invention are to provide a peripheral device having an embedded operating system capable of being upgraded with extended functionality by a user or a third party operator, in a manner that is simple, cost effective, and requires a reduced number of hardware and software components, without requiring the support complexities of PIC/PID, and in a manner that does not require a customer to administer a hard disk drive, require the use of special tools to package code into a ROFF entity, nor require the use of a proprietary "loader" to load such program code indicative of extended features.

DESCRIPTION OF THE DRAWINGS

FIG. 2 is a functional block diagram of a presently preferred embodiment of the invention illustrating a system for configuring functionality to a peripheral device embodied as a printer.

DETAILED DESCRIPTION OF THE INVENTION

Figure 1:
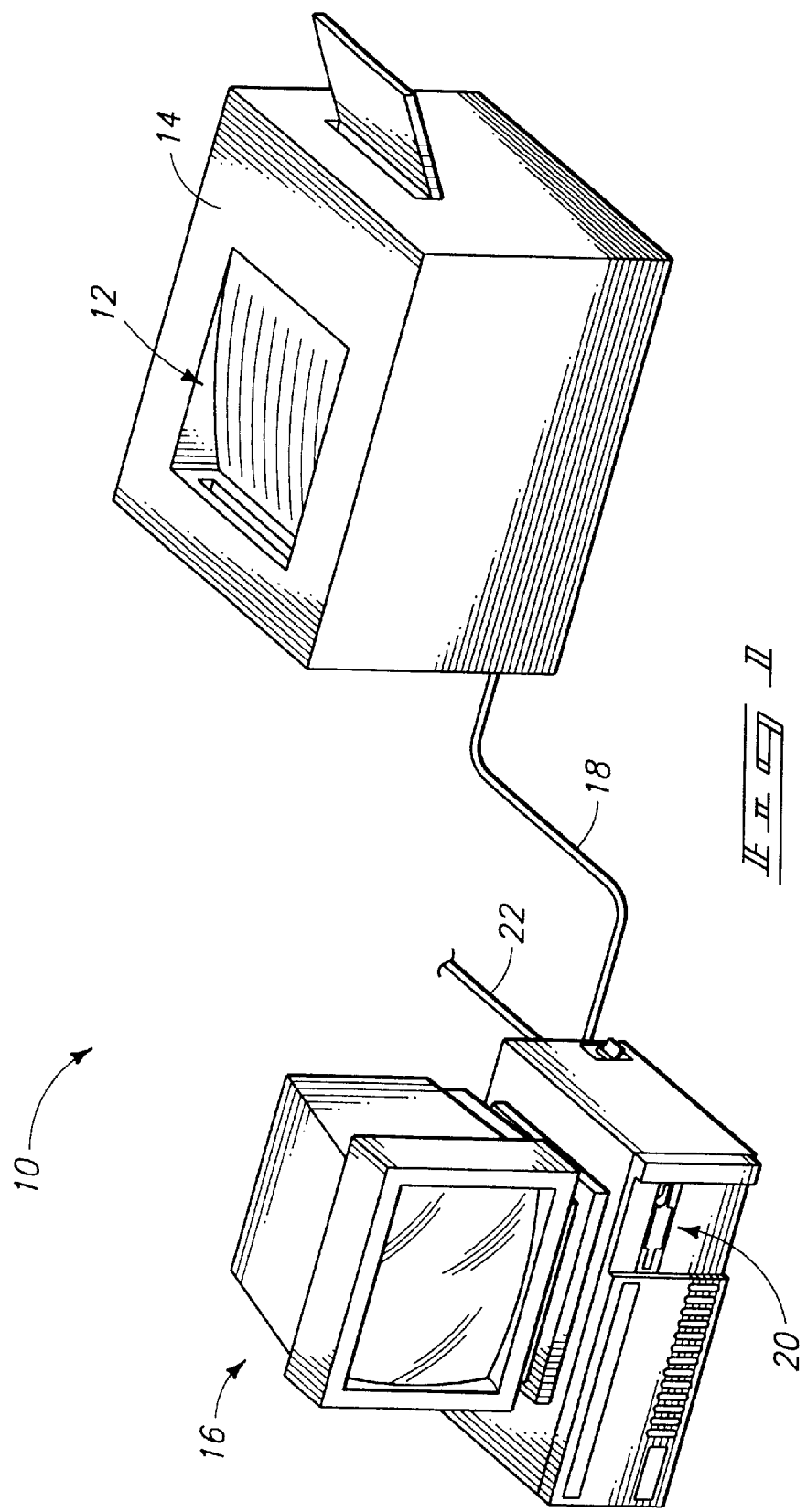
FIG. 1 is a perspective view of one peripheral device embodied with features of this invention and implemented as a printer.

This disclosure of the invention is submitted in furtherance of the constitutional purposes of the U.S. Patent Laws "to promote the progress of science and useful arts". U.S. Constitution, Article 1, Section 8.

A preferred embodiment of the invention is illustrated in the accompanying drawings particularly showing a system for extending functionality to a peripheral device generally designated with the numeral 10 in FIG. 1. System 10 generally is implemented on a peripheral device 12 as shown in FIG. 2, and more particularly in one implementation on a printer 14. According to FIG. 1, peripheral device 12 comprises a printer 14 that is connected to interact with one or more computers such as personal computer (PC) 16 via an Input/Output (I/O) interface 18.

According to the implementation depicted in FIGS. 1 and 2, peripheral device 12 is a printer 14 that is signal coupled via I/O interface 18 with computer 16. However, it is understood that peripheral device 12 can form any hardware device that is connected to a computer. For example, peripheral device 12 can be a Multi-Function Peripheral (MFP), printer, plotter, monitor, graphics tablet, external memory device, scanner, or tactile input device.

Also according to the FIGS. 1–2 implementation, computer 16 is a personal computer (PC). However, it is understood that computer 16 can be any general-purpose machine that processes data by way of a set of instructions that are stored internally of the machine. The machine includes hardware and instructions in the form of software. Specific sets of instructions are configured to perform a particular task in the form of a software program. The instructions in the software program direct the computer to input, process and output information/data. The computer can be a PC, a network computer, a microprocessor or chip-based computer, a workstation, a server, a mainframe, or a supercomputer.

According to FIG. 1, I/O interface 18 comprises a pathway into and out of printer 14 and computer 16 that interconnects printer 14 and computer 16. I/O interface 18 can comprise serial and/or parallel ports on a personal computer that include external sockets for plugging into printer 14, modems, communications lines, or other peripheral devices. I/O interface 18 can also comprise an expansion board in the form of a printed circuit board that plugs into an expansion slot on a computer or peripheral. One example is a printer cable, as shown in FIG. 1, comprising a wire with associated device-compatible connectors configured to connect a printer to a computer. Other examples are display adapters, disk controllers and sound cards. Additionally, I/O interface 18 can be configured to connect a peripheral 12 to a plurality of associated devices such as other peripherals and computers.

Computer 16 includes a peripheral storage device illustrated as a disk drive 20 operative to enable direct access to software code and data by computer 16 and peripheral 12. Additionally or optionally, a telephone line 22 forms an internet/intranet access device via a modem or ISDN line that is usable by computer 16 and peripheral 12 to transfer code and data with other remote devices.

FIG. 2 illustrates in greater detail the construction of system 10 comprising peripheral 12 configured as printer 14. Printer 14 communicates with computer 16 via I/O interface 18. Printer 14 includes a cross-development environment 24. Environment 24 includes an operating system 26 that runs printer 14. Additionally, a development computer 11 6 contains cross-development tools 28, and communications software 30, that form part of a development and execution environment according to this invention.

According to one implementation of system 10 shown in FIG. 2, operating system 26, cross-development tools 28, and communications software 30 form three highly integrated components of a development and execution environment that cooperate to configure operating system 26 to enable printer 14 for use with an embedded computer market. One suitable resulting execution environment 24 comprises VxWorks 5.3, an integrated cross-development environment comprising a scalable run-time system designed to enable developers to develop and execute environments for connecting processors and peripheral devices 12, such as printer 14. VxWorks 5.3 is developed, supported and sold by Wind River Systems, Inc., Corporate Headquarters, 1010 Atlantic Ave., Alameda, Calif. 94501.

Development computer 116 contains cross-development tools 28 and communications software 30 separately from operating system 26 in order to reduce the memory requirements of memory 34, and to facilitate enhanced operating speeds. It is understood that cross-development tools 28 and communication software 30 are only required when developing an environment for a specific embedded computer system, hence eliminating the need for a user to obtain development computer 116. Hence, once an execution environment has been defined, development computer 116 can be utilized with tools 28 and communications software 30 so as to specifically configure operating system 26 for the intended environment.

Printer 14 also includes a processor 32, memory 34, peripheral memory 48 and a Single In-line Memory Module (SIMM) socket 38. Peripheral memory 48 comprises a dedicated storage device. According to one construction, processor 32 comprises a central processing unit (CPU), memory 34 comprises Random Access Memory (RAM), and memory 48 comprises a Read-Only Memory (ROM). SIMM socket 38 is configured to removably receive a Read-Only Memory (ROM) SIMM 36 comprising a narrow printed circuit (PC) board that holds Read-Only Memory (ROM) chips. ROM SIMM 36 comprises a removable storage device. SIMM socket 38 is provided on a motherboard (not shown) or memory board (not shown) internally of printer 14. Optionally, the memory comprising ROM SIMM 36 can be formed as a Dual In-line Memory Module (DIMM) such that multiple chips are provided on a pair of boards configured to be received by socket 38.

ROM SIMM 36 is removably received or plugged into SIMM socket 38 in order to transfer an extended functionality algorithm 40 comprising code 42 and data 44 to printer 14 for use with processor 32. RAM 34, ROM SIMM 36 and ROM 48 cooperate with associated data and algorithms to provide firmware 46 that is quickly, easily, and cost-effectively upgradable by a third party developer and/or user.

Cross-development environment 24 comprises an embedded operating system 26 that is implemented as a real time operating system. In one form, embedded operating system 26 comprises VxWorks 5.3 which contains a number of built-in algorithms. Enabling algorithm 50 is stored in peripheral memory 48 and is operative via processor 32 to combine such algorithms in a unique way, and in a manner that generates the desired features found in the prior art, but without a number of disadvantages that are inherent in the prior art solutions.

More particularly, enabling algorithm 50 comprises associated program code 52 and data 54 that is loaded into ROM 48. Program code 52 comprises base code that allows a user to access updated code from ROM SIMM 36. Additionally, an extended functionality algorithm 40, containing code 42 and data 44, is provided on ROM SIMM 36. Enabling algorithm 50 is configured to interact with cross-development environment 24, here VxWorks, to load, copy and/or move the extended functionality of algorithm 40 into RAM 34. Extended functionality algorithm 40 is then executed directly in RAM 34.

ROM SIMM 36 is provided in the form of a removable storage device so that it can be shipped to a customer or user. The customer then installs ROM SIMM 36 into SIMM socket 38 to enable upgrading of the functionality realized by printer 14. More particularly, ROM SIMM 36 is installed such that a representation of a file that contains code 42 is loaded into RAM 34 from where it is retrieved and then executed by processor 32. When loaded onto ROM SIMM 36, extended functionality algorithm 40 enables the transfer of additional functionality to printer 14. For example, a new Page Description Language (PDL) can be delivered to printer 14 via SIMM 36. Likewise, a new or updated Printer Control Language (PCL) can be easily upgraded onto printer 14 by a user or third party user via SIMM 36. Additional functionality can be added by delivering other programs/data via SIMM 36 to printer 14.

In one construction, extended functionality algorithm 40 comprises a relocatable object module consisting of update code 42 and data 44 which enables upgrading of printer functionality. According to the one construction described above which uses VxWorks 5.3, such relocatable object module is produced by a compiler compatible with VxWorks 5.3.

Several operating features provided by VxWorks 5.3 include a loader that can take an object module file directly from a file system and "load" it into RAM 34 where it is to be executed by processor 32. Additionally, VxWorks 5.3 includes an algorithm that allows operating system 26 to access memory 34/36/48 as though it were a file on a file system.

In order to combine certain desirable algorithms within VxWorks 5.3, enabling algorithm 50 is implemented via processor 32 to enable and use certain desirable VxWorks 5.3 functions. Pseudo-code for such enabling algorithm 50 is given below:

```
romAddr = Address of ROM SIMM
romSize = Size of ROM SIMM

/* Initialize VxWorks Memory Driver */
memDrv( );

/* Create a "file system on the ROM" */
memDevCreate("/rom/", romAddr, romSize);
/* get a file descriptor (fd) */
fd = open("/rom/O", O_RDONLY);
```

-continued

```
/* Load the module to RAM */
loadModule(fd, LOAD_NO_SYMBOLS);
```

Implementation of enabling algorithm 50 as detailed in the above-illustrated pseudo-code solves third party code extension problems. More particularly, desirable algorithms contained with VxWorks 5.3 are initialized by way of such pseudo-code so as to enhance customer ease-of-use when upgrading functionality via code 42 and data 44 of extended functionality algorithm 40. Ease-of-use is provided by way of ROM SIMM 36, which is easily loaded into SIMM socket 38 to deliver code 42 and data 44, by a user or third party operator. Such implementation does not require the use of Position Independent Code/Position Independent Data (PIC/PID) in order to realize a solution. The elimination of any requirement for PIC/PID greatly simplifies the complexity of the implementation since additional support requirements are greatly reduced. Furthermore, there is no need for a proprietary "loader" that might otherwise need to be obtained from the originator of the peripheral device. Even furthermore, there is no need for tools that might otherwise be required to package the code and data into a ROFF entity. Finally, there is no need for a hard disk drive, which eliminates the need for a customer to administer such hard disk drive.

In operation, code 42 from enabling algorithm 40 is loaded into memory 34, preferably RAM, from where it is retrieved during execution. Embedded operating system 26 contains an industry standard algorithm capable of performing such loading when implemented as VxWorks 5.3. Even furthermore, the actual amount of code which is copied to memory 34 is relatively small, which enhances ease of use and implementation speed. Additionally, extended functionality algorithm 40 is actually executed directly in memory 48 (ROM), with code 42 being retrieved from RAM 34 as needed.

For purposes of further understanding the implementation of printer entities, a description is given below of Relocatable Object File Format (ROFF) entities. According to this implementation, code 42/52 and data 44/54 are preferably packaged in such a ROFF data configuration.

Relocatable Object File Format (ROFF) Entity

All printer entities follow the same format—an entity header followed by entity data. The entity header is shown below. The entity data contains the strings pointed to by the ROFF header, and ROFF data.

ROFF Header

The ROFF header is the first part of the entity. The ROFF header contains information required to process the entity.

Type contains the ASCII character "ROFF" to indicate the entity is the ROFF entity.

Size indicates the size of the entire ROFF entity in bytes. If the ROFF entity is stored on the file system, then Size must match the file size.

SupportedHardware has the same definition as the supported hardware field in the PERS entity.

```
typedef struct {
    uint32  Type;
    uint32  Size;
    uint32  SupportedHardware;
    uint32  SupportedFirmware;
    ubyte   *ROFFStart;
    uint32  ROFFVersion;
    ubyte   *ROFFNameString;
    ubyte   *CopyrightInformation;
    uint32  CRC;
} ROFFEntity;
```

SupportedFirmware indicates the compatible printer firmware version. If SupportedFirmware is all zeros, the ROFF entity is compatible with all versions of the printer firmware. If the SupportedFirmware is not all zeros, then the SupportedFirmware must match DateCode in the SYSS entity containing the firmware currently executing, or the entity will be skipped.

ROFFStart specifies an entity relative offset to the first byte of the ROFF data.

ROFFVersion specifies the ROFF version used to encode the ROFF data. The MoBY printers support ROFF version 0x00000200.

ROFFNameString specifies an entity relative offset to a ZASCII string which contains text describing the purpose of the entity.

CopyrightInformation specifies an entity relative offset to a ZASCII string which contains the ROFF copyright information.

CRC contains a value which causes a 32 bit CRC of the entire entity to equal zero. The CRC algorithm can be found in pslibip.c (and duplicated in a few other code modules).

ROFF Entity Header Strings

By convention, the ROFFNameString and CopyrightInformation strings immediately follow the ROFF header.

Relocatable Object File Format (ROFF) Data

By convention, the ROFF data immediately follows the ROFF entity header strings. The location of the ROFF data is determined from the ROFFStart ROFF entity header field. ROFF data consists of a ROFF preamble, a table of section headers, raw section data, and relocation data.

When the linker generates relocatable code, the linker requires a starting address for the instruction space (ISpace) and a starting address for the data space (DSpace). Since the code is going to be relocated, the actual ISpace and DSpace starting addresses assumed by the linker are not critical. However, all relocatable addresses are relative to one of those two values. All relocatable instruction space addresses are relative to the ISpace starting address. All relocatable data space addresses are relative to the DSpace starting address. The term ISpace address refers to a relocatable instruction address. The term DSpace address refers to a relocatable data address.

ROFF Preamble Format

NumberOfSections indicates the number of section headers following the ROFF preamble.

Reserved is not used, but is provided to explicitly indicate alignment. Should be set to zero.

```
typedef struct {
    uint16  NumberOfSections;
    uint16  Reserved;
    uint32  DateStamp;
    uint32  EntryPoint;
    uint32  ISpaceStart;
    uint32  ISpaceSize;
    uint32  DSpaceStart;
    uint32  DSpaceSize;
} ROFFPreamble Type;
```

DateStamp contains the time/date stamp associated with the object file used to create this ROFF entity. This is in seconds since 00:00:00 GMT Jan. 1, 1970.

EntryPoint specifies the ISpace entry point address. EntryPoint must have a value in the range ISpaceStart . . . ISpaceStart+ISpaceSize−1.

ISpaceStart specifies the starting address of the ISpace used by the linker.

ISpaceSize specifies the size of ISpace data in bytes.

DSpaceStart specifies the starting address of the DSpace used by the linker.

DSpaceSize specifies the size of DSpace data in bytes.

Section Header Format

The table of section headers follows the ROFF preamble. The table of section headers consists of one or more section headers. The number of section headers is specified in the NumberOfSections field in the ROFF preamble.

```
typedef struct {
    uint32  SectionAddress;
    uint32  SectionSize;
    ubyte   *RawData;
    ubyte   *RelocationEntries;
    uint32  NumberOfRelocationEntries;
    uint16  Section Flags;
    ubyte   Section Type;
    ubyte   Reserved;
} ROFFSectionHeaderType;
```

SectionAddress specifies the ISpace or DSpace address of the first byte of data in this section. SectionType indicates if the section is in ISpace or DSpace.

SectionSize specifies the size of the section in bytes.

RawData specifies an entity relative offset to the first byte of the section's raw (not relocated) data.

RelocationEntries specifies an entity relative offset to the first byte of the relocation entry data.

NumberOfRelocationEntries specifies the number of relocation entries for the section.

SectionFlags indicate the type of data stored in the section. Only flags that are known to be supported at the time this specification were documented. Other values may be supported as required.

| SectionFlags Value | Meaning |
| --- | --- |
| 0x0020 | Text(TEXT) |
| 0x0040 | Initialized data (DATA) |

-continued

| | |
|---|---|
| 0x0080 | Uninitialized data (BSS) |
| 0x8020 | Literal data (LIT) |

SectionType indicates the section data type (1-space or D-space) and indicates if the data is relocatable.

| SectionType Value | Meaning |
|---|---|
| 0x01 | Load into I-space, do not relocate. |
| 0x02 | Load into D-space, do not relocate. |
| 0x81 | Load into I-space, relocate. |
| 0x82 | Load into D-space, relocate. |

Raw Data Format

Typically, the raw data referenced by the section headers follows the last section header. There is no specified format for the raw data.

Relocation Data Format

Typically, the relocation data referenced by the section headers follows the raw data. The relocation data consists of a table of relocation entries.

```
typedef struct {
    union {
        sint32 SectionDataOffset;
        sint32 RelocatableAddress;
    } r;
    ubyte SectionNumber;
    ubyte RelocationType;
} ROFFRelocationEntryType;
```

SectionDataOffset specifies the relative address of the information being relocated. The address is relative to the RawData field in the associated section header. The value will be in the range 0 . . . SectionSize−1. This element of the union is valid whenever RelocationType !=0×1C (IHCONST).

RelocatableAddress specifies the ISpace or DSpace relative address for the previous reference. The address space (ISpace or DSpace) is determined by checking the Section-Type field in the associated section header. This element of the union is valid only when RelocationType==0×1C (IHCONST).

SectionNumber specifies the section number where the relocatable address was defined.

RelocationType indicates what type of relocation needs to be performed.

| RelocationType Value | Meaning |
|---|---|
| 0x19 | Bits 17-10 to byte 2, bits 9-2 to byte 0 (LABS) |
| 0x1C | Instruction high half (CONSTH) part 2 (IHCONST) |
| 0x1D | Relocatable byte value (BYTE) |
| 0x1E | Relocatable half-word value (HWORD) |
| 0x1F | Relocatable word value (WORD) |
| 0x20 | Instruction low half (CONST) (ILOHALF) |
| 0x21 | Instruction high half (CONSTH) part 1 (IHIHALF) |

In compliance with the statute, the invention has been described in language more or less specific as to structural and methodical features. It is to be understood, however, that the invention is not limited to the specific features shown and described, since the means herein disclosed comprise preferred forms of putting the invention into effect. The invention is, therefore, claimed in any of its forms or modifications within the proper scope of the appended claims appropriately interpreted in accordance with the doctrine of equivalents.

What is claimed:

1. An apparatus for extending functionality to a peripheral, comprising:
    a peripheral device having a processor, a dedicated storage device containing an enabling algorithm comprising a program code, and a receiver;
    an embedded operating system associated with the peripheral device; and
    a removable Read Only Memory (ROM) having relocatable object code for providing extended functionality to the peripheral device in association with the embedded operating system;
    wherein the receiver is adapted to receive the ROM and the enabling algorithm program code is configured to enable the relocatable object code for use by the peripheral device such that a functionality of the peripheral device is operatively extended.

2. The apparatus of claim 1 wherein the receiver comprises a SIMM socket.

3. The apparatus of claim 1 wherein the peripheral device comprises a printer.

4. The apparatus of claim 1 wherein the embedded operating system comprises VxWorks.

5. The apparatus of claim 1 wherein the removable ROM comprises a ROM SIMM.

6. The apparatus of claim 1 further comprising Random Access Memory (RAM).

7. The apparatus of claim 1 wherein the enabling algorithm comprises program code and data.

8. A system for configuring functionality within a peripheral, comprising:
    an I/O interface for receiving input commands;
    a peripheral device having a processor and a dedicated storage device configured to perform mechanical functions in response to a command from a separate device, connected via the I/O interface;
    an embedded operating system enabled via the processor;
    a removable ROM associated with the peripheral via a receiver, the ROM being enabled to represent a file system and having relocatable object code stored therein; and,
    an enabling program stored in the storage device, the enabling program configured to enable the relocatable object code in association with the embedded operating system to provide extended functionality for the peripheral.

9. The system of claim 8 wherein the I/O interface comprises a printer cable.

10. The system of claim 8 wherein the peripheral device comprises a printer.

11. The system of claim 8 wherein the embedded operating system comprises VxWorks.

12. The system of claim 8 wherein the embedded operating system comprises a real-time operating system.

13. The system of claim 8 wherein the receiver includes a SIMM socket and the ROM includes a ROM SIMM.

14. A method for enhancing functionality of a peripheral device, comprising:
    providing a removable ROM having a relocatable object file stored thereon indicative of extended functionality for the peripheral device;

storing an enabling algorithm in a dedicated storage device of the peripheral device; and executing the enabling algorithm to enable the relocatable object file in the ROM to enhance functionality of the peripheral device within an operating system of the peripheral device.

15. The method in accordance with claim 14 wherein the enabling algorithm comprises the steps of:

initializing a memory driver;

establishing a mechanism to represent the ROM as a file system;

providing a file descriptor that identifies a location of the relocatable object file in the ROM; and, loading the relocatable object file into a random access memory of the peripheral device for enabling extended functionality of the peripheral device.

16. A method in accordance with claim 14 wherein the removable ROM is received in a Single In-line Memory Module (SIMM) socket in the peripheral device.

17. A method in accordance with claim 14 wherein the operating system comprises VxWorks.

* * * * *